(12) United States Patent  
Takamuku et al.

(10) Patent No.: US 7,981,545 B2  
(45) Date of Patent: Jul. 19, 2011

(54) NEGATIVE ACTIVE MATERIAL FOR RECHARGEABLE LITHIUM BATTERY AND RECHARGEABLE LITHIUM BATTERY INCLUDING THE SAME

(75) Inventors: Akira Takamuku, Yokohama (JP); Sung-Soo Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 718 days.

(21) Appl. No.: 12/003,642

(22) Filed: Dec. 28, 2007

(65) Prior Publication Data

US 2008/0182172 A1    Jul. 31, 2008

(30) Foreign Application Priority Data

Dec. 28, 2006  (JP) ................................. 2006-354406  
Nov. 26, 2007  (KR) ....................... 10-2007-0120978

(51) Int. Cl.  
*H01M 4/48* (2010.01)  
*H01M 4/50* (2010.01)

(52) U.S. Cl. ................ 429/231.2; 429/231.5; 423/594.8

(58) Field of Classification Search ............... 429/231.2; 423/594.8  
See application file for complete search history.

(56) References Cited

U.S. PATENT DOCUMENTS

2005/0079417 A1* 4/2005 Kim et al. .................. 429/231.2  
2008/0038635 A1* 2/2008 Sheem et al. ................. 429/212

FOREIGN PATENT DOCUMENTS

| CN | 1624960 C | 6/2005 |
|---|---|---|
| CN | 1783551 | 6/2006 |
| JP | 06-302320 A | 10/1994 |
| JP | 2002-216753 | 8/2002 |
| KR | 1020050077079 A | 8/2005 |
| KR | 100814880 B1 | 3/2008 |

* cited by examiner

*Primary Examiner* — John S Maples  
(74) *Attorney, Agent, or Firm* — Robert E. Bushnell, Esq.

(57) ABSTRACT

A negative active material for a rechargeable lithium battery includes a lithium vanadium composite oxide represented by $Li_xM_yV_zO_{2+d}$, where:

$0.1 \leq x \leq 2.5$, $0 \leq y \leq 0.5$, $0.5 \leq z \leq 1.5$, $0 \leq d \leq 0.5$, and M is selected from the group consisting of Al, Cr, Mo, Ti, W, Zr, and combinations thereof) and a compound attached to the surface of the vanadium composite oxide. The compound includes an element selected from the group consisting of Groups 2 to 15 elements and combinations thereof. The negative active material can provide good energy density per volume and high-capacity, to provide a battery having good cycle-life and safety.

14 Claims, 4 Drawing Sheets

NEGATIVE ACTIVE MATERIAL FOR RECHARGEABLE LITHIUM BATTERY AND RECHARGEABLE LITHIUM BATTERY INCLUDING THE SAME

CLAIM OF PRIORITY

This application makes reference to, incorporates the same herein, and claims all benefits accruing under 35 U.S.C. §119 from applications for NEGATIVE ACTIVE MATERIAL FOR RECHARGEABLE LITHIUM BATTERY AND RECHARGEABLE LITHIUM BATTERY INCLUDING THE SAME, earlier filed in the Japanese Patent Office on the 28$^{th}$ of Dec. 2006 with assigned Serial No. 2006-354406, and filed in the Korean Intellectual Property Office on the 26$^{th}$ of Nov. 2007 with assigned Serial No. 10-2007-0120978.

BACKGROUND OF THE INVENTION

1. Field of the Invention

The present invention relates to a negative active material for a rechargeable lithium battery and a rechargeable lithium battery including the negative active material. More particularly, the present invention relates to a rechargeable lithium battery including a lithium vanadium composite oxide negative active material.

2. Description of the Related Art

In general, a conventional rechargeable lithium battery includes lithium cobalt oxide, $LiCoO_2$ as a positive active material, graphite as a negative active material, and a non-aqueous solution as an electrolyte. Rechargeable lithium batteries have been widely used as a power source for electronic devices such as cellular phones, digital still cameras, digital video cameras, laptop computers, and other portable appliances, and for electrical back-up.

As for a negative active material for a rechargeable lithium battery, a carbon-based material such as artificial or natural graphite, hard carbon, and so on has been used. Graphite among the carbon-based materials increases discharge voltage and energy density for a battery, because it has a low discharge potential of 0.2V, in comparison with lithium. Therefore, a battery including graphite as a negative active material has a high average discharge potential of 3.6V and excellent energy density.

Furthermore, the graphite is most comprehensively used among the aforementioned carbon-based materials, because graphite guarantees better cycle life for a battery due to its outstanding reversibility.

Since the graphite has low density (theoretical density: 2.2 g/cc) however, a negative electrode including the graphite as a negative active material has a low energy density per unit volume, consequently resulting in low capacity when used for a battery.

In order to ameliorate this problem, substantial research on an oxide negative electrode has recently been performed. For example, a negative active material of $Li_aMg_bVO_c$ where:

(0.05≦a≦3, 0.12≦b≦2, 2≦2c-a-2b≦5)

was disclosed in Japanese Patent Publication No. 2002-216753 to Yamamoto et al., entitled Lithium Secondary Battery, Negative Electrode Material For The Same And Manufacturing Method Of The Same, published on the 2$^{nd}$ of Aug. 2002.

This conventional oxide negative active material however, does not have sufficient energy density or capacity per unit volume, and may not provide satisfactory performance as a negative electrode for a battery.

Therefore, substantial additional research on oxide negative materials, their properties, characteristics and utilities, is required.

SUMMARY OF THE INVENTION

It is therefore, one object of the present invention to provide an improved negative active material and a rechargeable lithium battery including an improved negative active material.

It is another object to provide a negative electrode formed of an improved negative active material and a rechargeable lithium battery including that negative electrode.

One embodiment of the present invention provides a negative active material for a rechargeable lithium battery having high capacity due to the high energy density per unit volume, long cycle life, and excellent safety of the negative active material.

Another embodiment of the present invention provides a rechargeable lithium battery including the negative active material including a lithium vanadium composite oxide.

The embodiments of the present invention are not limited to the above technical purposes, and a person of ordinary skill in the art can understand other technical purposes.

According to one embodiment of the present invention, provided is a negative active material for a rechargeable lithium battery including a lithium vanadium composite oxide represented by the composition of $Li_x M_y V_z O_{2+d}$, where:

$0.1 \leq x \leq 2.5, 0 \leq y \leq 0.5, 0.5 \leq z \leq 1.5$, and $0 \leq d \leq 0.5$, and M is selected from the group consisting of Al, Cr, Mo, Ti, W, Zr, and combinations thereof, and a compound attached to the surface of the vanadium composite oxide. The compound includes an element selected from the group consisting of Groups 2 to 15 elements of the Periodic Table, and combinations thereof.

The compound may include an element selected from the group consisting of Zr, Mg, Al, Y, and combinations thereof.

The compound may be one selected from the group consisting of an oxide, a nitride, a halide, a sulfide, a hydroxide, and combinations thereof, which include an element selected from the group consisting of Zr, Mg, Al, Y, and combinations thereof.

The compound may be selected from the group consisting of yttrium oxide ($Y_2O_3$), zirconium oxide ($ZrO_2$), and a combination thereof.

According to another embodiment of the present invention, a rechargeable lithium battery is provided that includes a positive electrode including a positive active material, a negative electrode including the above negative active materials, and a non-aqueous electrolyte.

The negative active material includes a lithium vanadium composite oxide represented by $Li_x M_y V_z O_{2+d}$ and a compound attached to the surface of the vanadium composite oxide, which is capable of improving reactivity of the lithium vanadium composite oxide during intercalation of lithium ions. The compound includes an element selected from the group consisting of Groups 2 to 15 elements and combinations thereof. The compound may include an element selected from the group consisting of Zr, Mg, Al, Y, and combinations thereof. The compound may be one selected from the group consisting of an oxide, a nitride, a halide, a sulfide, a hydroxide, and combinations thereof, which include an element selected from the group consisting of Zr, Mg, Al, Y, and combinations thereof. The compound may be selected from the group consisting of yttrium oxide ($Y_2O_3$), zirconium oxide ($ZrO_2$), and a combination thereof.

Accordingly, the negative active material can suppress decomposition reactions of a non-aqueous electrolyte on the surface when lithium ions are inserted.

In addition, the negative active material can improve thermal stability of a rechargeable lithium battery.

Furthermore, since the negative active material includes a lithium vanadium composite represented by $Li_xM_yV_zO_{2+d}$, the negative active material can increase energy density, and the negative active material has a correspondingly improved discharge potential comparable to graphite.

When the negative active material is applied to a rechargeable lithium battery, the negative active material can have increased energy density per unit volume, and simultaneously, an enhanced cycle-life for the battery.

Therefore, the present invention can provide a negative active material for a rechargeable lithium battery with a long cycle-life and excellent safety due to the increased energy density per unit volume and the high-capacity of the negative active material and a rechargeable lithium battery including the negative active material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the present invention will now be described. Implementation of the principles of the present invention is not limited by these exemplary embodiments however, but is defined only by the following claims.

Turning now to the drawings, according to one embodiment of the present invention, a rechargeable lithium battery includes a positive electrode, a negative electrode, and a non-aqueous electrolyte.

Figure 1:
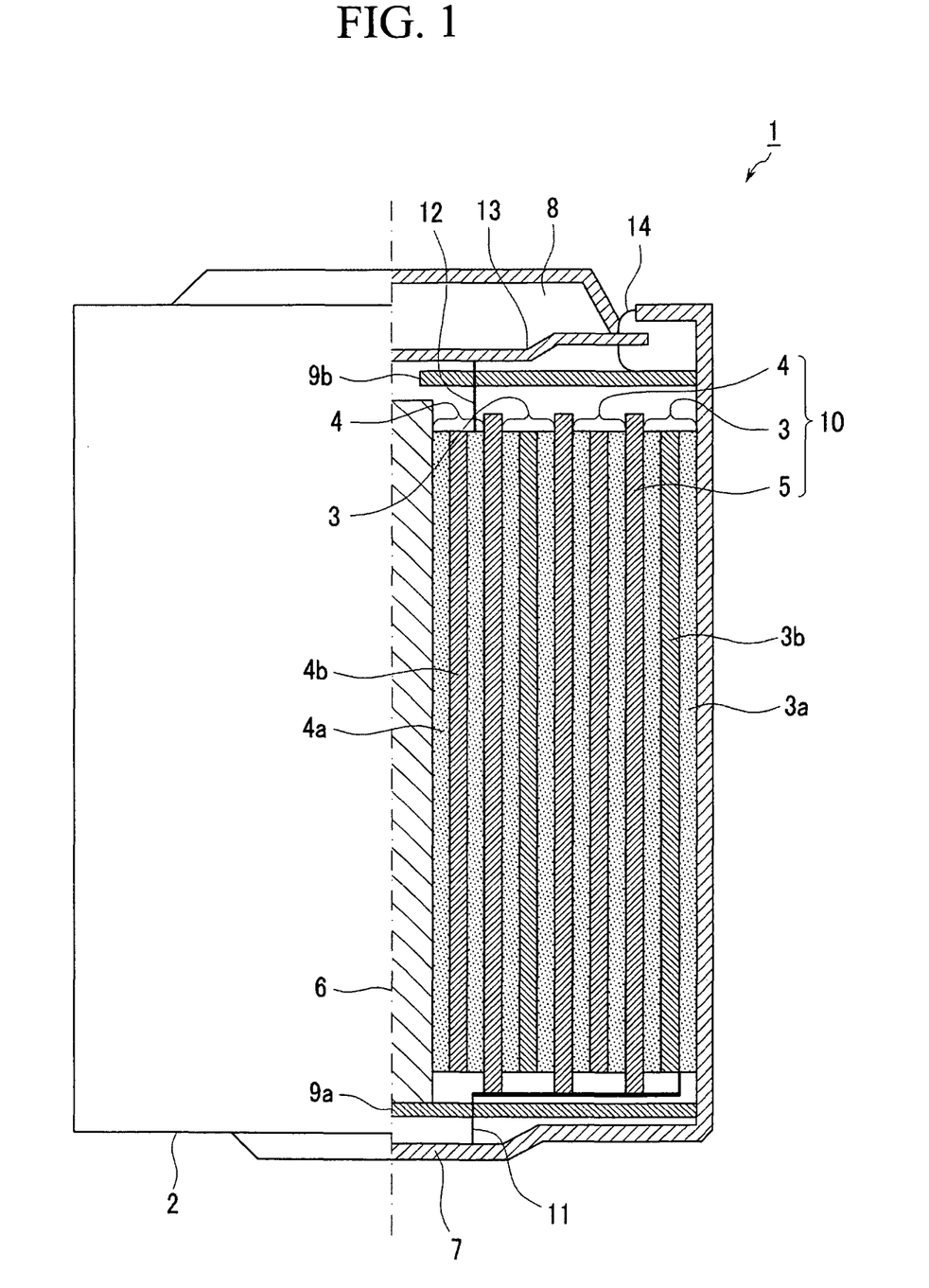
FIG. 1 is a vertical cross-sectional elevation view of a non-aqueous rechargeable battery that may be constructed as one embodiment of the present invention.

FIG. 1 is a vertical cross-sectional elevation view of a non-aqueous rechargeable battery that may be constructed as one embodiment of the present invention. Non-aqueous rechargeable battery 1 may be configured as a spirally wound cylindrical battery. Non-aqueous rechargeable battery 1 may include center pin 6 and electrode assembly 10 wound around center pin 6. Herein, electrode assembly 10 collectively includes positive electrode 3 and negative electrode 4, and separator 5 inserted between positive electrode 3 and negative electrode 4. Accordingly, electrode assembly 10 may be arranged with a cylindrical structure. Positive electrode 3 may be formed by disposing positive active mass 3a including a positive active material on both surfaces of positive current collector 3b. Negative electrode 4 may be formed by disposing negative active mass 4a including a negative active material on both surfaces of negative current collector 4b. Cylindrical electrode assembly 10 may be housed in cylindrical case 2 with a hollow interior, and is impregnated with an electrolyte (not separately shown). In the particular embodiment illustrated, positive electrode 3 contacts case 2, and has positive terminal 7 that protrudes at the bottom of case 2. This particular embodiment may also be constructed with electrode assembly 10 mounted with insulating plates 9b and 9a at the top and bottom thereof. Positive current collector 3b may pass, as shown, through insulating plate 9a and contacts positive terminal 7 by way of positive electrode lead 11. Safety plate 13 may be mounted above insulating plate 9b located at the opened base end of case 2 in the same direction as insulating plate 9b. Negative terminal 8 may be shaped as a convex cap and is mounted on safety plate 13 in the opposite direction to safety plate 13. Negative current collector 114b in this embodiment may be oriented to pass through insulating plate 9b and contacts negative terminal 8 by way of negative electrode lead 12. In addition, safety plate 13 and the edge of negative terminal 8 may be sealed by an electrically insulating gasket 14, which may separate safety plate 13 and negative terminal 8 from positive terminal 7.

The negative electrode includes a negative active material. The negative active material includes a lithium vanadium composite oxide and a compound including one or more than one element consisting of Group 2 to 15 attached on the surface thereof. This negative active material can improve thermal stability and safety of a rechargeable lithium battery.

Hereinafter, a positive electrode, a negative electrode, and a non-aqueous electrolyte included in the present invention and a rechargeable lithium battery are illustrated in more detail.

Positive Electrode

The positive electrode of a rechargeable lithium battery includes a positive active mass including a positive active material being capable of intercalating and deintercalating lithium ions, a conductive agent, and a binder; and a positive current collector on which the positive active mass is disposed.

The positive active mass may be formed into a disk-shape to provide a pellet-shaped or sheet-shaped electrode.

The positive active mass may further include a compound for forming a membrane. The compound for forming a membrane may include any compound being capable of providing a positive electrode with Li at the initial charge and accept Li again at the discharge to compensate the initial charge and discharge efficiency.

The positive active material may be a Li-containing compound, an oxide, a sulfide, and so on. The positive active material may include at least one metal selected from the group consisting of Mn, Co, Ni, Fe, Al, and combinations thereof. Examples of the positive active material include $LiMn_2O_4$, $LiCoO_2$, $LiNiO_2$, $LiFeO_2$, $LiNi_{1/3}Co_{1/3}Mn_{1/3}O_2$, $LiNi_{0.8}CO_{0.2}O_2$, and so on.

The binder may include polyvinylidene fluoride, polytetrafluoro ethylene, and so on.

The conductive agent may include a carbonaceous material such as carbon black, ketjen black, graphite, and so on.

The positive current collector may include a metal foil or a metal net formed of aluminum, stainless steel, and so on.

Negative Electrode

The negative electrode includes a negative active mass including a negative active material being capable of intercalating and deintercalating lithium ions, a conductive agent, and a binder; and a negative current collector on which the negative active mass is disposed.

The negative active mass may be formed in a disk-shape to fabricate a pellet-shaped or sheet-shaped electrode.

The binder for the negative electrode may be any organic or inorganic material that can be dispersed or dissolved in a solvent along with the negative active material, and bind the negative active material after removal of the solvent.

Further, the binder can bind the negative active material by mixing the negative active material and then press-forming it.

The binder may be selected from the group consisting of a vinyl-based resin, a cellulose-based resin, a phenol resin, a thermoplastic resin, a thermosetting resin, and so on. Specifically, the binder may be polyvinylidene fluoride, polyvinyl alcohol, carboxylmethyl cellulose, styrene butadiene rubber, and so on.

The negative electrode may further include a conductive agent such as carbon black, a graphite powder, a carbon fiber, a metal powder, a metal fiber, and so on, besides the negative active material and the binder.

The negative current collector may include a metal foil or a metal net formed of copper.

The negative active material includes a lithium vanadium composite oxide represented by $Li_x M_y V_z O_{2+d}$ and a compound attached to the surface of the vanadium composite oxide. The compound includes an element selected from the group consisting of Groups 2 to 15 elements and combinations thereof. The compound may include an element selected from the group consisting of Zr, Mg, Al, Y, and combinations thereof. The compound may be one selected from the group consisting of an oxide, a nitride, a halide, a sulfide, a hydroxide, and combinations thereof that includes an element selected from the group consisting of Zr, Mg, Al, Y, and combinations thereof. The compound may be selected from the group consisting of yttrium oxide, zirconium oxide, and a combination thereof.

In $Li_x M_y V_z O_{2+d}$, the x, y, z, and d are as follows:

$0.1 \leq x \leq 2.5, 0 \leq y \leq 0.5, 0.5 \leq z \leq 1.5$, and $0 \leq d \leq 0.5$, and M is selected from the group consisting of Al, Cr, Mo, Ti, W, Zr, and combinations thereof.

The $Li_x M_y V_z O_{2+d}$ can have a discharge potential and cycle-life characteristics that are similar to those of graphite. The lithium vanadium composite oxide with the above composition can provide more than 1000 mAh/cc of capacity per unit volume.

The $Li_x M_y V_z O_{2+d}$ has an R-3M (i.e., R$\bar{3}$M.) structure in which lithium and oxygen, and a transition element and oxygen, are alternatively stacked. In other words, the R-3M (i.e., R$\bar{3}$M.) structure indicates that reversible lithium can be intercalated and deintercalated by substituting Li for a part of transition elements (V) and substituting third transition elements (for example, Ti, Mo, Cr, Al, and the like) for the Li.

On the other hand, "-3" in the R-3M (i.e., R$\bar{3}$M.) structure indicates "3" with a bar (-), or overstrike, on top, as $\bar{3}$. Thus, R$\bar{3}$M.

In other words, the $LiVO_2$ structure means that the V metal ion layer where some of V metal ions are substituted with Li and the third metal, is disposed in the oxygen ion octahedron site between the oxygen ions having hexagonal closed packing, and Li ions are disposed in the lower layer of the octahedron site.

If lithium is intercalated thereto to provide $Li_2VO_2$, the structure is also changed into what includes a V metal ion layer where some of V metal ions are substituted with Li and the third metal, an oxygen ion layer, a Li layer, an oxygen ion layer, and a V metal ion layer where some of V metal ions are substituted with Li and the third metal.

In order to facilitate the intercalation and deintercalation of lithium at a low potential, some of the V metal ion layer of the $Li_x M_y V_z O_{2+d}$ composition is substituted with Li and the third metal (M element) to increase the lattice constant which is a distance along with the axis a.

Thereby, the lithium layer is broader and it facilitates the intercalation and deintercalation of the lithium in the crystal structure.

The easy intercalation and deintercalation of the lithium increases the diffusion rate of the lithium upon charging and discharging the battery so that the cycle-life and the charge and discharge efficiency of the battery are improved.

According to the embodiment of the present invention, a lithium vanadium composite oxide is included, which is represented by $Li_x M_y V_z O_{2+d}$ and has the aforementioned lattice structure. The $Li_x M_y V_z O_{2+d}$ composition is optimal for intercalating and deintercalating lithium at the low potential. The $Li_x M_y V_z O_{2+d}$ includes vanadium (V) with an average oxidation number ranging from +univalent to +quadrivalent. In another embodiment, it may include an average oxidation number ranging from +univalent to +trivalent. In other words, vanadium (V) of the lithium vanadium composite oxide has less than one (1 V) Volt of oxidation reduction potential compared with lithium, when the lithium vanadium composite oxide is used within a range of +univalent to +quadrivalent as a positive active material. A vanadium oxide as a conventional positive active material however, has an oxidation reduction reaction couple ranging from mainly +trivalent to +quadrivalent or +quadrivalent to +5-valent, and has more than two (2V) Volts of initial oxidation reduction potential compared with lithium. Accordingly, the lithium vanadium composite oxide has a very low oxidation reduction potential of less than one (1V) Volt, when compared with the conventional one. That is, when an oxide represented by $Li_x M_y V_z O_{2+d}$ is used as a negative active material, it can secure a high discharge voltage.

When the $Li_x M_y V_z O_{2+d}$ has x, y, z, and d out of the range, it can have an increased average potential of more than 2.5V compared with lithium, and thereby decreased discharge voltage.

In addition, the $Li_x M_y V_z O_{2+d}$ has a distance ratio (c/a ratio) ranging from 2.5 to 6.5 before insertion of lithium. In another embodiment, it may have a ratio ranging from 3.0 to 6.2.

When $Li_x M_y V_z O_{2+d}$ has a distance ratio out of the range, lithium may be structurally hard to intercalate and deintercalate. It also has increased the intercalation and deintercalation potential of more than 0.6V, and thereby a hysteresis phenomenon in which a potential difference between intercalation and deintercalation increases due to reaction of oxygen as an ion.

The $Li_x M_y V_z O_{2+d}$ may have a distance ratio (c/a ratio) ranging from 3.5 to 7.0 after insertion of lithium. In another embodiment, it may have a distance ratio of 4.0 to 7.0. When $Li_x M_y V_z O_{2+d}$ has a smaller ratio than the range, it may have little lattice change due to Li. When it has a bigger ratio than the range, it may be difficult to maintain its crystal structure.

Since the $Li_x M_y V_z O_{2+d}$ has a theoretical density per unit volume of 4.2 g/cc, it can have an actual density per unit volume of more than 3.0 g/cc when it is fabricated. In addition, when it has a capacity of more than 300 mAh/g, it has a theoretical capacity per unit volume of more than 1200 mAh/cc and an actual capacity per unit volume of more than 900 mAh/cc.

Compared with graphite as a conventional negative active material having a theoretical density per unit volume of 2.0 g/cc, a density of 1.6 g/cc when it is used as a negative electrode, and an actual capacity of 570 mAg/cc when it has a capacity of 360 mAh/g, the $Li_xM_yV_zO_{2+d}$ has more than twice the density.

The compound attached to the surface of $Li_xM_yV_zO_{2+d}$ may include a compound including elements of Groups 2 to 15 and combinations thereof. The compound may include an element selected from the group consisting of Zr, Mg, Al, Y, and combinations thereof. The compound may be one selected from the group consisting of an oxide, a nitride, a halide, a sulfide, a hydroxide, and combinations thereof that include an element selected from the group consisting of Zr, Mg, Al, Y, and combinations thereof. The compound may be selected from the group consisting of yttrium oxide, zirconium oxide, and a combination thereof.

The compound can be attached on the surface of $Li_xM_yV_zO_{2+d}$ by mixing a carbonate salt such as Zr and the like and $Li_xM_yV_zO_{2+d}$ and firing them. It can also be attached by simultaneously firing a carbonate salt such as Zr and the like and Li, M, and V materials of $Li_xM_yV_zO_{2+d}$, or mechanochemically unifying a carbonate salt such as Zr and the like and $Li_xM_yV_zO_{2+d}$.

Accordingly, the compound may include an element with a large ion radius among elements of Groups 2 to 15, particularly, one with a larger ion radius than V (vanadium) to effectively be attached on the surface of $Li_xM_yV_zO_{2+d}$. The element with a larger ion radius than V (vanadium) may include Y (yttrium) or Zr (zirconium).

Herein, the "attachment" means partially coating the surface of $Li_xM_yV_zO_{2+d}$ with the compound. When the whole surface of $Li_xM_yV_zO_{2+d}$ is coated with the compound however, the $Li_xM_yV_zO_{2+d}$ may have a deteriorated ability to provide intercalation and deintercalation of lithium ions.

In addition, the element of Groups 2 to 15 can be permeated inside $Li_xM_yV_zO_{2+d}$ or substituted for V or M element and diffused therein.

As one or two elements of Group 2 to 15 are diffused inside $Li_xM_yV_zO_{2+d}$, they may transform the surface structure of $Li_xM_yV_zO_{2+d}$ and can thereby contribute to characteristic improvement.

In general, $Li_xM_yV_zO_{2+d}$ tends to have an unstable surface during the charge compared with graphite and so decomposes a non-aqueous electrolyte. A negative active material however, $Li_xM_yV_zO_{2+d}$ with the composition attached on the surface, can suppress decomposition of a non-aqueous electrolyte on the surface and thereby improve thermal stability.

On the other hand, the compound including one or two elements of Groups 2 to 15 may be attached in an amount ranging from 0.5 wt % to 10 wt % on the surface of a lithium vanadium composite oxide. In another embodiment, it may be attached in an amount ranging from 0.5 wt % to 10 wt % or in an amount ranging from 0.5 wt % to 3 wt %. When it is attached in an amount of more than 0.5 wt %, it can increase thermal stability of a negative active material. In addition, when it is attached in an amount of less than 10 wt %, it may prevent a sharp deterioration of discharge capacity of a negative active material.

Therefore, the present invention can provide a negative active material with excellent thermal stability and small exothermic heat of 40 mW/g to 0 mW/g. The exothermic heat is generated when an active material is charged and discharged. The smaller the exothermic heat an active material has, the better the stability it has.

The negative active material can be prepared in the following three methods.

First, a lithium vanadium composite oxide represented by $Li_xM_yV_zO_{2+d}$ and a carbonate salt such as Zr, Mg, Al, Y, and the like or a hydroxide is prepared. Next, the composite oxide is mixed with the carbonate salt and the like with water or without water. The mixture is fired at a temperature ranging from 400° C. to 1400° C. under a non-oxidation atmosphere such as with nitrogen, argon, and the like. The firing time can vary depending on firing temperature. In this way, a negative active material is prepared to include a lithium vanadium composite oxide and an oxide such as Zr, Mg, Al, Y, and the like attached on the surface.

On the other hand, the lithium vanadium composite oxide represented by $Li_xM_yV_zO_{2+d}$ is prepared by first mixing vanadium, lithium, and M materials in a solid-phase. The vanadium, lithium, and M materials may have various mixing ratio as long as they can result in a $Li_xM_yV_zO_{2+d}$ composition.

The vanadium material may include vanadium metal, VO, $V_2O_3$, $V_2O_4$, $V_2O_5$, $V_4O_7$, $VOSO_4.n_2O$, or $NH_4VO_3$. The lithium material may be selected from lithium carbonate, lithium hydroxide, nitric acid lithium, and acetic acid lithium. The M material may include an oxide including a metal selected from Al, Cr, Mo, Ti, W, and Zr, or a hydroxide. Examples are $Al(OH)_3$, $Al_2O_3$, $Cr_2O_3$, $MoO_3$, $TiO_2$, $WO_3$, $ZrO_2$, and the like.

The mixture of vanadium, lithium, and M materials is heat-treated at a temperature ranging from 500° C. to 1400° C. under a reduction atmosphere. In another embodiment, it may be heat-treated at a temperature ranging from 900° C. to 1200° C. to prepare a vanadium composite oxide.

When the heat treatment is performed at a temperature out of the range between 500° C. and 1400° C., impurities such as $Li_3VO_4$ and the like may be produced, which may deteriorate battery capacity and cycle-life characteristics.

The reduction atmosphere may include a nitrogen atmosphere, an argon atmosphere, a $N_2/H_2$ gas atmosphere, a $CO/CO_2$ gas atmosphere, or a helium atmosphere. Herein, the reduction atmosphere may have an oxygen partial pressure of less than $2 \times 10^{-1}$ Pa. When the reduction atmosphere has an oxygen partial pressure of more than $2 \times 10^{-1}$ Pa, it can turn into an oxidation atmosphere, in which the mixture of vanadium, lithium, and M materials may be synthesized into another oxygen-rich material or mixed with other impurities with an oxidation number of oxygen of more than 2, thereby generating unwanted oxidized product.

Secondly, a negative active material is prepared by first preparing a vanadium, lithium, and M materials and a carbonate salt such as Zr, Mg, Al, Y, and the like or a hydroxide. The vanadium, lithium, and M materials are mixed in various ratios as long as they can result in a $Li_xM_yV_zO_{2+d}$ composition.

Next, they are mixed with water or without water and then fired at a temperature ranging from 400° C. to 1400° C. under a non-oxidation atmosphere such as with nitrogen, argon, and the like. The firing time can vary depending on the firing temperature. In this way, a negative active material is prepared to include a lithium vanadium composite oxide and an oxide such as Zr, Mg, Al, Y, and the like attached on the surface thereof.

Thirdly, a lithium vanadium composite oxide represented by $Li_xM_yV_zO_{2+d}$ is mixed with an oxide including one or two elements of Groups 2 to 15, a nitride, a halide, a sulfide, a hydroxide, combinations thereof with water or without water.

Next, the mixture is treated in a mechanochemical method to respectively attach an oxide, a nitride, a halide, a sulfide, a hydroxide, or combinations thereof on the surface of the lithium vanadium composite oxide.

In this way, a negative active material is prepared to include a lithium vanadium composite oxide and an oxide including one or two elements of Groups 2 to 15, a nitride, a halide, a sulfide, a hydroxide, or combinations thereof attached on the surface thereof.

Non-aqueous Electrolyte

The non-aqueous electrolyte is a lithium salt dissolved in an aprotic solvent.

The aprotic solvent generally includes a cyclic carbonate, a linear carbonate, or combinations thereof.

Examples of the combinations of cyclic carbonate and linear carbonate include ethylene carbonate and dimethyl carbonate; ethylene carbonate and methylethyl carbonate; ethylene carbonate and diethylcarbonate; propylene carbonate and dimethyl carbonate; propylene carbonate and methylethyl carbonate; propylene carbonate and diethylcarbonate; ethylene carbonate, propylene carbonate, and dimethyl carbonate; ethylene carbonate, propylene carbonate, and methylethyl carbonate; ethylene carbonate, propylene carbonate, and diethylcarbonate; ethylene carbonate, dimethyl carbonate, and methylethyl carbonate; ethylene carbonate, dimethyl carbonate, and diethyl carbonate; ethylene carbonate, methylethyl carbonate, and diethyl carbonate; ethylene carbonate, dimethyl carbonate, methylethyl carbonate, and diethyl carbonate; ethylene carbonate, propylene carbonate, dimethyl carbonate, and methylethyl carbonate; ethylene carbonate, propylene carbonate, dimethyl carbonate, and diethyl carbonate; ethylene carbonate, propylene carbonate, methylethyl carbonate, and diethyl carbonate; and ethylene carbonate, propylene carbonate, dimethyl carbonate, methylethyl carbonate, and diethyl carbonate.

The cyclic carbonate and linear carbonate are mixed in a weight ratio of 1:99 to 99:1. In another embodiment, they are mixed in a weight ratio of 5:95 to 70:30. In still another embodiment, they may be mixed in a weight ratio of 10:90 to 60:40. When they are mixed within the above ranges, they can provide a non-aqueous electrolyte that does not deteriorate charge and discharge characteristic of a rechargeable lithium battery but has good electrical conductivity.

On the other hand, a lithium salt may include, $$LiPF_6, LiBF_4, LiClO_4, LiAsF_6, Li_2SiF_6, LiOSO_2C_kF_{(2k+1)},$$

where (is an integer from 1 to 8), $LiPF_nC_kF_{(2k+1, 6-n)}$ (n is an integer from 1 to 5 and k is an integer from 1 to 8), and the like. In addition, it may include a lithium salt represented as follows: $LiC(SO_2R^5, SO_2R^6, SO_2R^7)$, $LiN(SO_2OR^8, SO_2OR^9)$, $LiN(SO_2R^{10}, SO_2OR^{11})$, $LiN(SO_2R^{12}, SO_2R^{13})$.

Herein, $R^5$ to $R^{13}$ can be the same or different perfluoro alkyl groups with 1 to 8 carbons. Their lithium salts can be used in singularly or in a mixture of two or more.

The non-aqueous electrolyte may be a polymer electrolyte prepared by mixing one of the lithium salts with a polymer such as polyethylene oxide, polyvinyl alcohol, and the like, or by impregnating a non-protonic solvent and a lithium salt into a polymer with a highly-swelling property.

In addition, a rechargeable lithium battery of the present invention may include other members other than a positive electrode, a negative electrode, and a non-aqueous electrolyte, for example a separator separating the positive and negative electrodes.

Herein, a separator is necessary when the non-aqueous electrolyte is not a polymer electrolyte. It may appropriately include a common one such as a porous polypropylene film, a porous polyethylene film, and the like.

As described, the negative active material includes a lithium vanadium composite oxide represented by $Li_xM_yV_zO_{2+d}$ and a compound attached to the surface of the vanadium composite oxide and being capable of improving reactivity of the lithium vanadium composite oxide during intercalation of lithium ions. The compound includes an element selected from the group consisting of Groups 2 to 15 elements and combinations thereof. The compound may include an element selected from the group consisting of Zr, Mg, Al, Y, and combinations thereof. The compound may be one selected from the group consisting of an oxide, a nitride, a halide, a sulfide, a hydroxide, and combinations thereof that include an element selected from the group consisting of Zr, Mg, Al, Y, and combinations thereof. The compound may be selected from the group consisting of yttrium oxide, zirconium oxide, and a combination thereof.

Accordingly, a rechargeable lithium battery including these negative active materials can suppress a decomposition reaction of a non-aqueous electrolyte on the surface of the negative active material, when lithium ions are inserted. In addition, the negative active materials can increase thermal stability of a rechargeable lithium battery.

Furthermore, since a negative active material of the present invention includes a lithium vanadium composite oxide represented by $Li_xM_yV_zO_{2+d}$, that negative active material containing vanadium can increase energy density and has a corresponding discharge potential which is comparable to graphite.

Accordingly, when this negative active material is applied to a rechargeable lithium battery, it can increase energy density per unit volume and simultaneously improve cycle-life.

The following examples illustrate the present invention in more detail. These examples are only exemplary embodiments however, and do not limit the present invention.

EXAMPLE 1

First of all, $V_2O_4$ and $LiCO_3$ powders were mixed to prepare a mixed powder. Herein, lithium and vanadium were mixed in a mole ratio of Li:V=1.1:0.9.

The mixed powder was fired at 1100° C. for ten (10) hours under a nitrogen atmosphere, where nitrogen flowed at a speed of 5 L/min, to prepare a lithium vanadium composite oxide represented by $Li_{1.1}V_{0.9}O_2$.

Then, 3 wt % of zirconium carbonate was added to 97 wt % of the lithium vanadium composite oxide and mixed together without water. The resulting product was fired at 1100° C. for ten (10) hours under a nitrogen atmosphere where nitrogen flowed at a speed of 5 L/min, preparing a negative active material of Example 1.

The negative active material of Example 1 was measured regarding X-ray diffraction. As a result, $ZrO_2$ (zirconium oxide) was identified. Zirconium carbonate was not found however.

EXAMPLE 2

A negative active material of Example 2 was prepared according to the same method as Example 1 except for adding yttrium carbonate instead of zirconium carbonate.

The negative active material of Example 2 was measured regarding X-ray diffraction. As a result, $Y_2O_3$ (yttrium oxide) was found. Yttrium carbonate however, was not found.

EXAMPLE 3

A lithium vanadium composite oxide represented by $Li_{1.1}V_{0.9}O_2$ was prepared according to the same method as Example 1.

Then, 3 wt % of zirconium carbonate and 3 wt % of yttrium carbonate were added to 94 wt % of the lithium vanadium composite oxide and mixed together without water. The resulting product was fired at 1100° C. for ten (10) hours under a nitrogen atmosphere where nitrogen flowed at a speed of 5 L/min, thereby producing a negative active material of Example 3.

The negative active material of Example 3 was measured by X-ray diffraction. As a result, $ZrO_2$ (zirconium oxide) and $Y_2O_3$ (yttrium oxide) were found. Zirconium carbonate and yttrium carbonate were not found however.

EXAMPLE 4

$V_2O_4$ and $LiCO_3$ powders were mixed to prepare a mixed powder. Herein, lithium and vanadium were mixed in a mole ratio of Li:V=1.1:0.9.

Then, 97 wt % of the mixed powder was mixed with 3 wt % of zirconium carbonate with water and then dried. The resulting product was fired at 1100° C. for ten (10) hours under a nitrogen atmosphere where nitrogen flowed at a speed of 5 L/min, in order to prepare a negative active material for Example 4.

The negative active material of Example 4 was measured regarding X-ray diffraction. As a result, a lithium vanadium composite oxide represented by $Li_{1.1}V_{0.9}O_2$ and $ZrO_2$ (zirconium oxide) were found. Zirconium carbonate was not found however.

EXAMPLE 5

A lithium vanadium composite oxide represented by $Li_{1.1}V_{0.9}O_2$ was prepared according to the same method as Example 1.

Then, 97 wt % of the lithium vanadium composite oxide was mixed with 3 wt % of $ZrO_2$ (zirconium oxide) without water.

The mixture was treated in a mechanochemical method, preparing a negative active material of Example 5.

The mechanochemical treatment was performed by using mechanofusion (AMS) (Hosokawa Micron Corporation) for five (5) minutes.

The negative active material of Example 5 was measured regarding X-ray diffraction. As a result, a lithium vanadium composite oxide represented by $Li_{1.1}V_{0.9}O_2$ and $ZrO_2$ (zirconium oxide) were identified.

COMPARATIVE EXAMPLE 1

A lithium vanadium composite oxide represented by $Li_{1.1}V_{0.9}O_2$ was prepared according to the same method as Example 1. Then, the lithium vanadium composite oxide represented by $L_{1.1}V_{0.9}O_2$ was used to prepare a negative active material of Comparative Example 1.

COMPARATIVE EXAMPLE 2

A lithium vanadium composite oxide represented by $L_{1.1}V_{0.9}O_2$ was prepared according to the same method as Example 1.

Then, 97 wt % of the lithium vanadium composite oxide was mixed with 3 wt % of $ZrO_2$ (zirconium oxide) for two hours with a ball mill to prepare a negative active material for Comparative Example 2.

COMPARATIVE EXAMPLE 3

A lithium vanadium composite oxide represented by $L_{1.1}V_{0.9}O_2$ was prepared according to the same method as Example 1.

Then, 97 wt % of the lithium vanadium composite oxide $L_{1.1}V_{0.9}O_2$ was mixed with 3 wt % of $Y_2O_3$ (yttrium oxide) without water for two (2) hours by using a ball mill in order to prepare a negative active material of Comparative Example 3.

Evaluation

Figure 2:
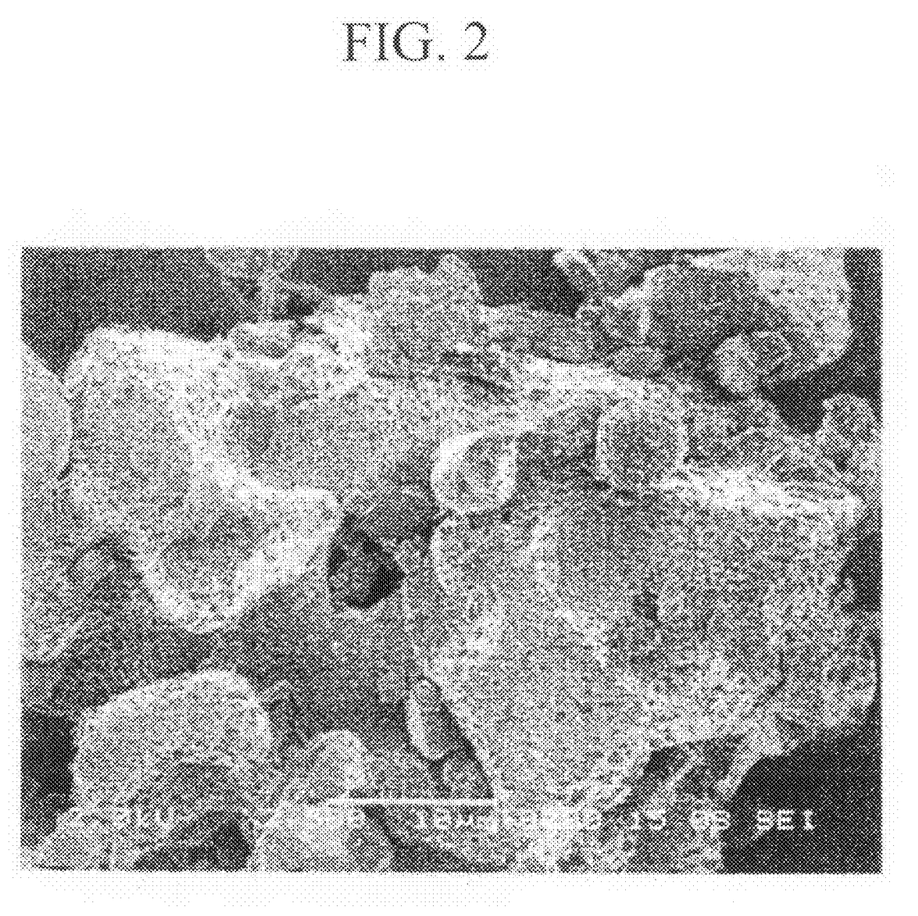
FIG. 2 shows a SEM photograph of a negative active material according to Example 1 of the present invention.
Figure 3:
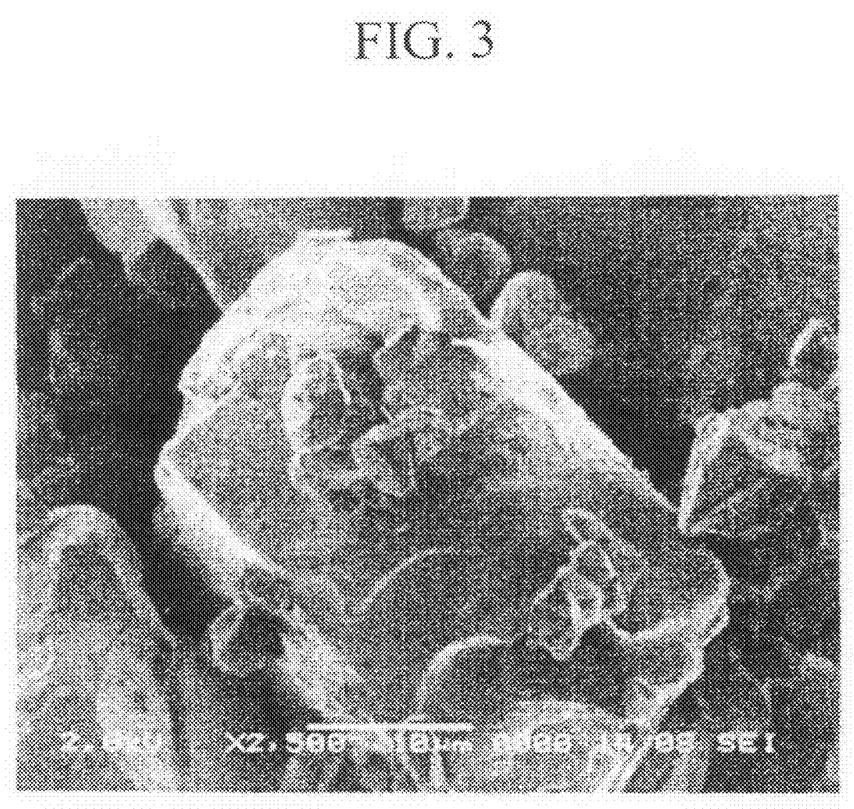
FIG. 3 shows a SEM photograph of a negative active material according to Comparative Example 1.

The surface of the negative active materials of Example 1 and Comparative Example 1 were examined with a scanning electronic microscope (SEM). FIG. 2 shows the SEM photograph of the negative active material of Example 1, and FIG. 3 shows the SEM photograph of the negative active material of Comparative Example 1.

In addition, slurry was prepared by respectively dissolving 80 parts by weight of the negative active materials according to Examples 1 to 5 and Comparative Examples 1 to 3, 10 parts by weight of carbon black as a conducting agent, and 10 parts by weight of polyvinylidene fluoride. Then, it was coated on a Cu film and dried, and cut in a predetermined size to prepare a test electrode.

In addition, a lithium thin membrane electrode was prepared as a counter electrode. Then, a polypropylene separator was positioned between the electrode and the counter electrode to form an electrode assembly. The electrode assembly was contained in a coin-type case.

Then, an electrolyte solution was prepared by dissolving 1.3M of $LiPF_6$ in a mixed solvent in which ethylene carbonate (EC) and dimethyl carbonate (DMC) were mixed in a volume ratio of EC:DMC=3:7. The electrolyte solution was inserted into the case. The case was sealed to fabricate test cells of Examples 1 to 3.

The test cells according to Examples 1 to 5 and Comparative Examples 1 to 3 were charged with a constant current at a charge current of 0.2 C up to an ending voltage of zero, i.e., 0 Volts, and then charged with a constant voltage.

Then, they were discharged with a discharge current of 0.2 C down to 2.0 Volts. The following Table 1 shows discharge capacity of each cell.

In addition, they are charged at a charge current of 0.2 C again down to an ending voltage of zero, i.e., 0 Volts, and then decomposed to produce test electrodes. The test electrodes were evaluated regarding exothermic peak temperature and exothermic heat by performing differential scanning calorimetry (DSC) at of an initial temperature of 40° C., an increasing temperature of 10° C./min, and an ending temperature of 300° C. The results are shown in Table 1.

TABLE 1

|  | Compound attached to the surface | Addition amount (wt %) | Manufacturing method | Exothermic peak temperature (° C.) | Exothermic heat (mW/g) | Discharge capacity (based on that of Comparative Example 1 (100%) |
|---|---|---|---|---|---|---|
| Example 1 | $ZrO_2$ | 3 | dry | 132 | 20 | 100 |
| Example 2 | $Y_2O_3$ | 3 | dry | 130 | 22 | 100 |

TABLE 1-continued

|  | Compound attached to the surface | Addition amount (wt %) | Manufacturing method | Exothermic peak temperature (° C.) | Exothermic heat (mW/g) | Discharge capacity (based on that of Comparative Example 1 (100%)) |
|---|---|---|---|---|---|---|
| Example 3 | $Y_2O_3$ $ZrO_2$ | 3 3 | dry | 130 | 20 | 100 |
| Example 4 | $ZrO_2$ | 3 | wet | 130 | 20 | 100 |
| Example 5 | $ZrO_2$ | 3 | Mechanochemical method | 130 | 20 | 100 |
| Comparative Example 1 | None | 3 | dry | 120 | 100 | 100 |
| Comparative Example 2 | None | 3 | dry | 120 | 100 | 100 |
| Comparative Example 3 | None | 3 | dry | 120 | 100 | 100 |

In Table 1, the addition amount indicates the amount of a compound attached on the surface of lithium vanadium oxide.

As shown in Table 1, the negative active materials of Examples 1 through 5 had exothermic peak temperatures of 10° C. higher and a fifth less exothermic heat than the ones of Comparative Examples 1 to 3. Therefore, the negative active materials of Examples 1 to 5 had small exothermic heat, high exothermic peak temperature, and excellent thermal stability.

The negative active material of Comparative Examples 2 and 3 however, had similar peak temperatures and exothermic heat to the negative active material of Comparative Example 1, although they included zirconium oxide (in Comparative Example 2) or yttrium oxide (in Comparative Example 3). When either zirconium oxide or yttrium oxide is simply mixed with $Li_{1.1}V_{0.9}O_2$, the zirconium oxide or yttrium oxide can not secure thermal stability of a negative active material.

FIGS. 2 and 3 respectively show SEM photographs of the negative active materials from Example 1 and Comparative Example 1. Comparing FIG. 2 with FIG. 3, the negative active material from Example 1 included $ZrO_2$ formed on, and attached to, the surface of $Li_{1.1}V_{0.9}O_2$ particles.

Accordingly, zirconium oxide or yttrium oxide should not be mixed with $Li_{1.1}V_{0.9}O_2$, but should instead be fired or treated in a mechanochemical method to improve thermal stability of a negative active material. In addition, the negative active materials of Examples 1 to 5 had similar discharge capacities to the negative active materials of Comparative Examples 1 to 3. When either zirconium oxide or yttrium oxide is attached to negative active materials within a range of Table 1, they may not have much influence on the discharge capacity.

EXAMPLES 6 TO 10

A lithium vanadium composite oxide represented by $Li_{1.1}V_{0.9}O_2$ was prepared according to the same method as Example 1.

Then, zirconium carbonate was added to the lithium vanadium composite oxide and mixed together without water. Herein, the lithium vanadium composite oxide was mixed with zirconium carbonate in a ratio of 99.5:0.5 wt % (Example 6), 99:1 wt % (Example 7), 97:3 wt % (Example 8), 95:5 wt % (Example 9), and 90:10 wt % (Example 10).

On the other hand, 100 wt % of lithium vanadium composite oxide instead of zirconium carbonate was included in Comparative Example 4.

The acquired product was fired at 1100° C. for 10 hours under a nitrogen atmosphere in which nitrogen flowed at a speed of 5 L/min, respectively preparing negative active materials of Examples 6 to 10 and Comparative Example 4.

The negative active materials of Examples 6 to 10 were measured by using X-ray diffraction. As a result, $ZrO_2$ (zirconium oxide) was found. Zirconium carbonate however, was not found.

In addition, the negative active materials of Examples 6 to 10 and Comparative Example 4 were measured regarding discharge capacity and exothermic heat according to the same method as Examples 1 to 5 and Comparative Examples 1 to 3. The results of the discharge capacity and exothermic heat measured for each of Examples 6 to 10 and Comparative Example 4 as a function of the wt % gauged along the abscissa, which was added to each of Examples 6 to 10 and Comparative Example 4, are shown in FIG. 4.

Figure 4:
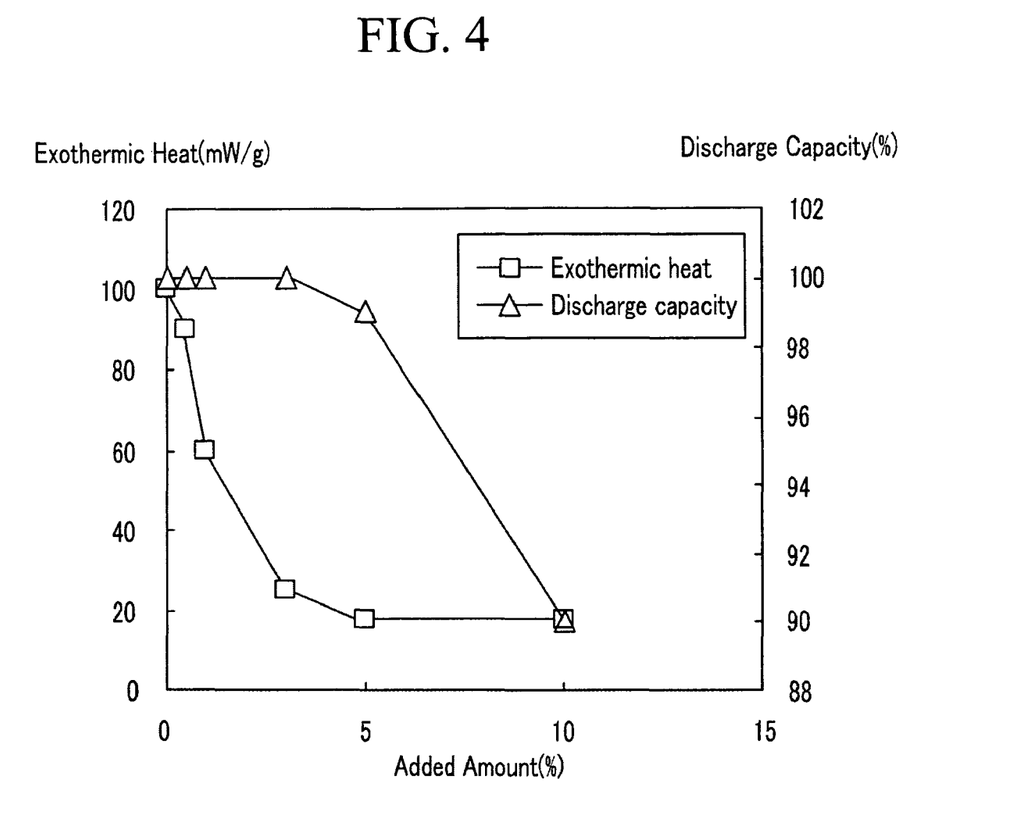
FIG. 4 is a three coordinate graph showing discharge capacity and exothermic heat of negative active materials of Examples 6 to 10 and Comparative Example 4 according to the amount in wt % of zirconium oxide added thereto gauged along the abscissa.

Referring to FIG. 4, the discharge capacity of each negative active material was calculated as a ratio, with consideration given to the discharge capacity of the negative active material of Comparative Example 4 which included 0%, i.e., no of zirconium oxide, as setting 100% of the discharge capacity along the rightmost ordinate of FIG. 4.

As shown in FIG. 4, as zirconium oxide is increasingly added, negative active materials tend to have decreased exothermic heat and due to their deterioration, markedly reduced discharge capacity.

Referring to FIG. 4, zirconium oxide may be included in an amount ranging from 0.5 wt % to 10 wt % based on the amount of lithium vanadium composite oxide. According to another embodiment, it may be included in an amount of less than 5 wt % or in an amount of less than 3 wt %.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:

a lithium vanadium composite oxide represented by $Li_xM_yV_zO_{2+d}$ wherein:

$0.1 \leq x \leq 2.5, 0 \leq y \leq 0.5, 0.5 \leq z \leq 1.5, 0 \leq d \leq 0.5$, and M selected from the group consisting of Al, Cr, Mo, Ti, W, Zr, and combinations thereof; and a compound comprising an element selected from the group consisting of Zr, Mg, Al, Y and combinations thereof and attached on the surface of the lithium vanadium composite oxide.

2. The negative active material of claim 1, wherein the compound comprises at least one selected from the group consisting of an oxide, a nitride, a halide, a sulfide, and a hydroxide.

3. The negative active material of claim 1, wherein the compound is selected from the group consisting of yttrium oxide, zirconium oxide, and combinations thereof.

4. The negative active material of claim 1, wherein the compound is attached in an amount ranging from 0.5 wt% to 10 wt%.

5. The negative active material of claim 4, wherein the compound is attached in an amount ranging from 0.5 wt% to 5 wt%.

6. The negative active material of claim 5, wherein the compound is attached in an amount ranging from 0.5 wt% to 3 wt%.

7. The negative active material of claim 1, which has exothermic heat ranging from 40 mW/g to 0 mW/g.

8. A rechargeable lithium battery, comprising:
    a positive electrode comprising a positive active material;
    a negative electrode comprising a negative active material, wherein a lithium vanadium composite oxide represented by $Li_xM_yV_zO_{2+d}$, where:

$0.1 \leq x \leq 2.5, 0 \leq y \leq 0.5, 0.5 \leq z \leq 1.5, 0 \leq d \leq 0.5$, and M is an element selected from the group consisting of Al, Cr, Mo, Ti, W, Zr, and combinations thereof; and
    a compound comprising an element selected from the group consisting of Zr, Mg, Al, Y and combinations thereof and attached on the surface of the lithium vanadium composite oxide;
    and a non-aqueous electrolyte.

9. The rechargeable lithium battery of claim 8, wherein the compound comprises at least one selected from the group consisting of an oxide, a nitride, a halide, a sulfide, and a hydroxide.

10. The rechargeable lithium battery of claim 8, wherein the compound is selected from the group consisting of yttrium oxide, zirconium oxide, and combinations thereof.

11. The rechargeable lithium battery of claim 8, wherein the compound is attached in an amount ranging from 0.5 wt% to 10 wt%.

12. The rechargeable lithium battery of claim 11, wherein the compound is attached in an amount ranging from 0.5 wt% to 5 wt%.

13. The rechargeable lithium battery of claim 12, wherein the compound is attached in an amount ranging from 0.5 wt% to 3 wt%.

14. The rechargeable lithium battery of claim 8, wherein the negative active material has exothermic heat ranging from 40 mW/g to 0 mW/g.

\* \* \* \* \*